April 24, 1951     G. D. HUDSON     2,550,068
MAGNETIC BRAKE EQUALIZING SYSTEM
Filed Dec. 6, 1948
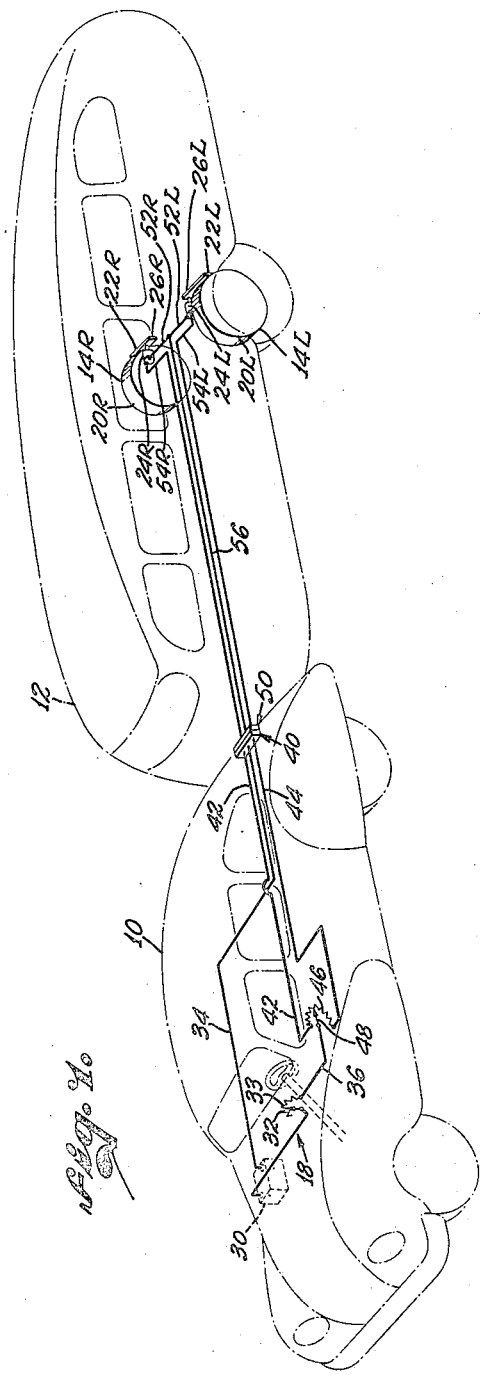
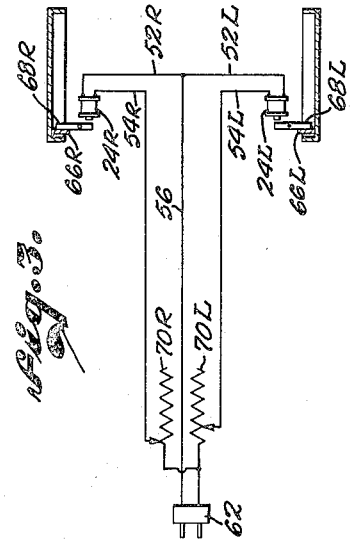
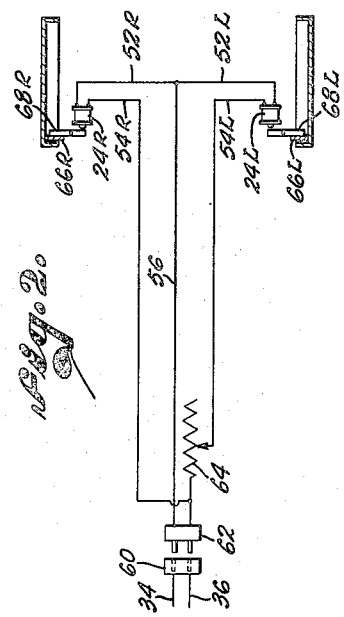
INVENTOR:
GEORGE D. HUDSON.
BY
*Reed C. Lawlor*
AGENT.

Patented Apr. 24, 1951

2,550,068

UNITED STATES PATENT OFFICE 2,550,068

MAGNETIC BRAKE EQUALIZING SYSTEM

George D. Hudson, Los Angeles, Calif., assignor to Hudson Manufacturing Company, Inc., a corporation of California Application December 6, 1948, Serial No. 63,641

3 Claims. (Cl. 188—3)

My invention relates to a system of magnetic brakes, and more particularly to an improved method of balancing a pair of magnetic brakes located on opposite sides of a trailer or other vehicle.

House trailers and other trailers which are drawn by an automobile or other leading vehicle are sometimes provided with brakes which are controlled from the driver's compartment of the vehicle. Magnetic type brakes are particularly suitable for this purpose since they can be easily controlled by electric current supplied from the vehicle. A magnetic brake of the type employed comprises a solenoid which actuates an armature, which in turn operates through a linkage to draw two friction members into braking engagement. As a result of wear and for other reasons, brakes on opposite sides of a trailer frequently become unbalanced.

The principal object of my invention is to provide an improved means for adjusting magnetic brakes located on opposite sides of a vehicle such as a trailer.

Another object of my invention is to provide means whereby the adjustment of the brakes on opposite sides of a trailer may be balanced by remote control from the driver's compartment of a front vehicle.

According to my invention the current supplied to the brake solenoids on opposite sides of the trailer are proportioned in such a way as to balance the braking forces applied by the brakes. More particularly in accordance with my invention, the current from a common control circuit, including a battery in the front vehicle, is divided into two parts which energize the two solenoids, and an equalizing resistance means is connected in the branch circuits supplying the solenoids which may be adjusted to balance the braking forces of the brakes. In its simplest form this equalizing means consists in a single variable rheostat which is connected in series with the solenoid of the stronger brake. By increasing the amount of resistance in this circuit the current supplied to the associated solenoid is reduced and the braking force of the corresponding brake is reduced. By adjusting the rheostat to the proper point the two brakes are balanced.

Other objects and features of my invention will appear more fully from a reading of the following detailed description taken in connection with the accompanying drawing in which:

Figure 1 is a perspective schematic drawing showing one embodiment of my invention;

Figure 2 is a schematic drawing of a second embodiment of my invention; and

Figure 3 is a schematic diagram of a third embodiment of my invention.

In Figure 1 a brake system designed in accordance with the principles of my invention is shown installed in an automobile 10 and a house trailer 12 which are mechanically coupled together in any conventional manner. In this system, two friction brakes 14R and 14L located respectively on the right and left sides of the house trailer 12, are controlled by means of a common control or power circuit 18 in the automobile 10.

The electrical connection between the power circuit 18 and the two brakes is made by means of a three-contact female plug 40 mounted at the rear of the automobile 10, and a three-contact male plug 50 mounted at the forward end of the trailer 12.

The right brake 14R comprises a cylindrical brake drum 20R, a brake shoe 22R, and a solenoid 24R. A magnetic armature 26R connected to the brake shoe 22R is mounted adjacent the solenoid 24R. The left brake 14L comprises a brake drum 20L, a brake shoe 22L, a solenoid 24L, and an armature 26L similarly arranged. In either case when current is applied to the solenoids 24R and 24L, the magnetic flux created thereby draws the corresponding armature 26R and 26L toward the respective solenoids, thereby pressing the brake shoes 22R and 22L into frictional engagement with the corresponding brake drums 20R and 20L.

The braking force applied by the corresponding wheel to the ground by the action of either brake 14R or 14L depends in part upon the strength of the magnetic flux generated in the corresponding solenoid and hence in part by the current flowing through the solenoid. I utilize this fact in my invention when the brakes become unbalanced by adjusting the ratio of the currents supplied to the solenoids in such a way that the braking forces applied by the two brakes are balanced.

The control or power circuit 18 located in the automobile 10 includes the automobile storage battery 30 and a rheostat 32 which are connected in series between a first conductor 34 and a second conductor 36. The first conductor 34 leads to a central contact of the female connector plug 40. Two wires 42 and 44 connected to the two outer contacts of the female plug 40 lead to opposite ends of a rheostat 46 which is mounted adjacent the dashboard of the automobile 10. A sliding contact 48 engaging this rheostat is connected to the second conductr 36.

A third conductor 52R and a fourth conductor 54R connected to opposite ends of the right solenoid 24R and fifth and sixth conductors 52L and 54L are connected to the opposite ends of the left solenoid 24L. The third and fifth conductors 52R and 52L are connected by a wire 56 to the central contact of the male plug 50. The fourth and sixth conductors 54R and 54L are connected to the outer contacts of the male plug 50. The two plugs 40 and 50 are preferably of the polarized type so that the fourth and sixth conductors 54R and 54L are always connected to the same ends respectively of the rheostat 46 when the two plugs 40 and 50 are engaged whenever the plug connection is made.

The switch 32 has a rheostat 33 associated therewith in such a way that the switch arm serves as a sliding contact. The switch 32 is normally open and when operated, serves to supply current from the battery to the solenoid. As the switch arm is moved more and more from its open position, the amount of resistance offered by the rheostat to the flow of current from the battery 30 is decreased, thus increasing the amount of current supplied to the solenoids 24R and 24L and thereby increasing the braking forces produced by the brakes 14R and 14L. Conversely, when the switch is moved toward its open position the braking forces are decreased, attaining their lowest values when the switch is open.

When the switch 32 is closed, the current from the battery 30 flows through the switch 32 and the rheostat 33 to the second conductor 36, and is there divided into two parts which flow through portions of the rheostat 46 on opposite sides of the contact 48. The part of the current which flows through the upper part of the rheostat 46 flows through the wire 42, the fifth conductor 54R, the right solenoid 24R, and then returns to the battery 30 through the third conductor 52R, the wire 56 and the first conductor 34. The part of the current which flows through the lower part of the rheostat 46 flows through the wire 44, the sixth conductor 54L, the left solenoid 24L, and then returns to the battery 30 through the fourth conductor 52L, the wire 56, and the first conductor 34.

The braking forces produced by the two brakes 14R and 14L are balanced by adjusting the contact 48 on the rheostat 46. This adjustment changes the proportion of resistance connected in series between the second conductor 36 and the two solenoids 24R and 24L, thus changing the ratio of the currents flowing at any time in these two solenoids and hence the ratio of the pressures applied between the corresponding shoes and brake drums. It is to be noted that the balancing of the two brakes is facilitated by the fact that the rheostat 46 is mounted in the driver's compartment of the car where access thereto may be obtained readily while the automobile 10 and the trailer 12 are being driven and the brakes tested.

In practice the two brakes 14R and 14L may be brought into approximate balance mechanically by conventional means, and the final balancing of the brakes may be achieved by manipulation of the rheostat 46. Preferably in making such an adjustment the contact 48 is set near the center of the rheostat during the mechanical adjustment and is only manipulated after an approximate balance has been achieved mechanically. Both when brakes are balanced in this manner and where subsequent adjustments are made, the values of the resistance in series with the solenoids, and the forces exerted by the solenoids on the armatures are generally different. In other words, the mechanical unbalance of the brakes is counteracted by an electrical unbalance so that the brakes are completely balanced so far as the overall effect of the mechanical parts and electrical parts are concerned.

In the embodiment of my invention illustrated in Figure 2 the first and second conductors 34 and 36 are connected to the contacts of a two-contact female plug 60 at the back of the automobile. In this case the third and fourth conductors 52R and 52L are connected by a common wire 56 to one contact of a two-contact male plug 62 as in the case described above. The fifth and sixth conductors 54R and 54L are connected to the other contact of the male plug 62, and in this case a rheostat 64 is installed in series with one of the conductors which connects with the solenoid of the stronger brake. In practice this rheostat may be installed in a magnetic braking system of the conventional type which has become mechanically unbalanced. By adjustment of this rheostat the braking forces produced by the two brakes on the opposite sides of the trailer may be balanced. It is to be noted that in the brakes shown here the solenoids 24R and 24L actuate internal brake shoes 66R and 66L through linkages 68R and 68L here symbolized by pivoted armatures.

The braking system illustrated in Figure 3 is similar to that illustrated in Figure 2 except that here the two rheostats 70R and 70L are connected in series between one contact of the male plug 62 and the fifth and sixth conductors 54R and 54L. Two such rheostats may be installed in a conventional electromagnetic brake system and may be adjusted to balance the brakes on opposite sides of a trailer whenever they become unbalanced. Preferably in using such a system the rheostat in series with the solenoid of the weaker brake is cut out of the circuit so that the braking force applied by this brake is not reduced, and a suitable portion of the other rheostat connected in series with the solenoid of the stronger brake is connected in the circuit so as to reduce the force of this brake to an amount equal to the force produced by the other brake.

While I have described three specific embodiments of my invention, it is to be understood that my invention may be embodied in still other forms. In particular it is to be understood that if desired a pair of rheostats such as that illustrated in Figure 3 may be installed in the leading vehicle in place of the single rheostat of Figure 1. In such a case the advantages of balancing the brakes by the driver may be obtained at the same time that the force produced by the weaker brake is not diminished. Also it is to be understood that the first conductor 34 and the wire 56 may actually be the metal chassis of the automobile 10 and the metal chassis of the trailer 12. Also, though I have described arrangements in which rheostats are installed adjacent the front end of a trailer, it is to be understood that they may be located at other points thereon, such for example, as at points adjacent the brakes themselves, and may even be incorporated in the brake assemblies. Furthermore, though I have described forms of my invention employing rheostats which are most convenient to adjust in practice, it is to be understood that other methods may be employed for adjusting the forces exerted by the solenoids. For example, these forces may be adjusted by changing the numbers of turns in the solenoids or by changing their spacing relative to the armatures. Since these and other variations in the application of my invention may now be readily made by those skilled in the art, I do not wish to be limited to the details of construction illustrated and described, but only by the scope of the appended claims.

I claim:

1. In a vehicle having a pair of friction brakes associated with wheels on opposite sides thereof, a corresponding pair of solenoids for controlling the braking force applied by said brakes, and first and second conductors adapted for energization from a common control circuit, said brakes being subject to unbalance due to inequalities of their parts: the combination therewith of third and fourth conductors respectively connecting opposite ends of one solenoid to said first and second conductors, fifth and sixth conductors respectively connecting opposite ends of the other solenoid to said first and second conductors, and adjustable resistor means connected in series with at least one of said four last mentioned conductors for controlling the proportion of current flowing to said solenoids when said first and second conductors are energized whereby the braking forces applied by said brakes may be substantially balanced.

2. In a vehicle adapted for pulling a trailer having a pair of solenoid controlled brakes on opposite sides thereof, said brakes being subject to unbalance due to inequalities of their parts, the improvement which comprises an electrical connector having three contacts mounted at the back end of said vehicle, a power circuit in said vehicle including a source of electric power and a switch, a conductor connecting one of said contacts to one end of said power circuit, and variable resistance means connecting each of the remaining contacts to the other end of said power circuit for controlling the ratio of the currents flowing to said remaining contacts whereby the ratio of the forces exerted by brake solenoids connected between said one contact and the respective remaining contacts may be adjusted.

3. Apparatus as defined in claim 2 wherein said variable resistance means is mounted adjacent to said connector.

GEORGE D. HUDSON.

REFERENCES CITED

The following references are of record in the file of this patent:

UNITED STATES PATENTS

| Number | Name | Date |
| --- | --- | --- |
| 1,818,920 | Minturn | Aug. 11, 1931 |
| 1,887,532 | Whyte | Nov. 15, 1932 |
| 2,380,765 | Keith | July 31, 1945 |
| 2,454,291 | Penrose | Nov. 23, 1948 |